J. RIDDELL.
BALANCING MACHINE.
APPLICATION FILED MAR. 1, 1905.
1,091,708.
Patented Mar. 31, 1914.
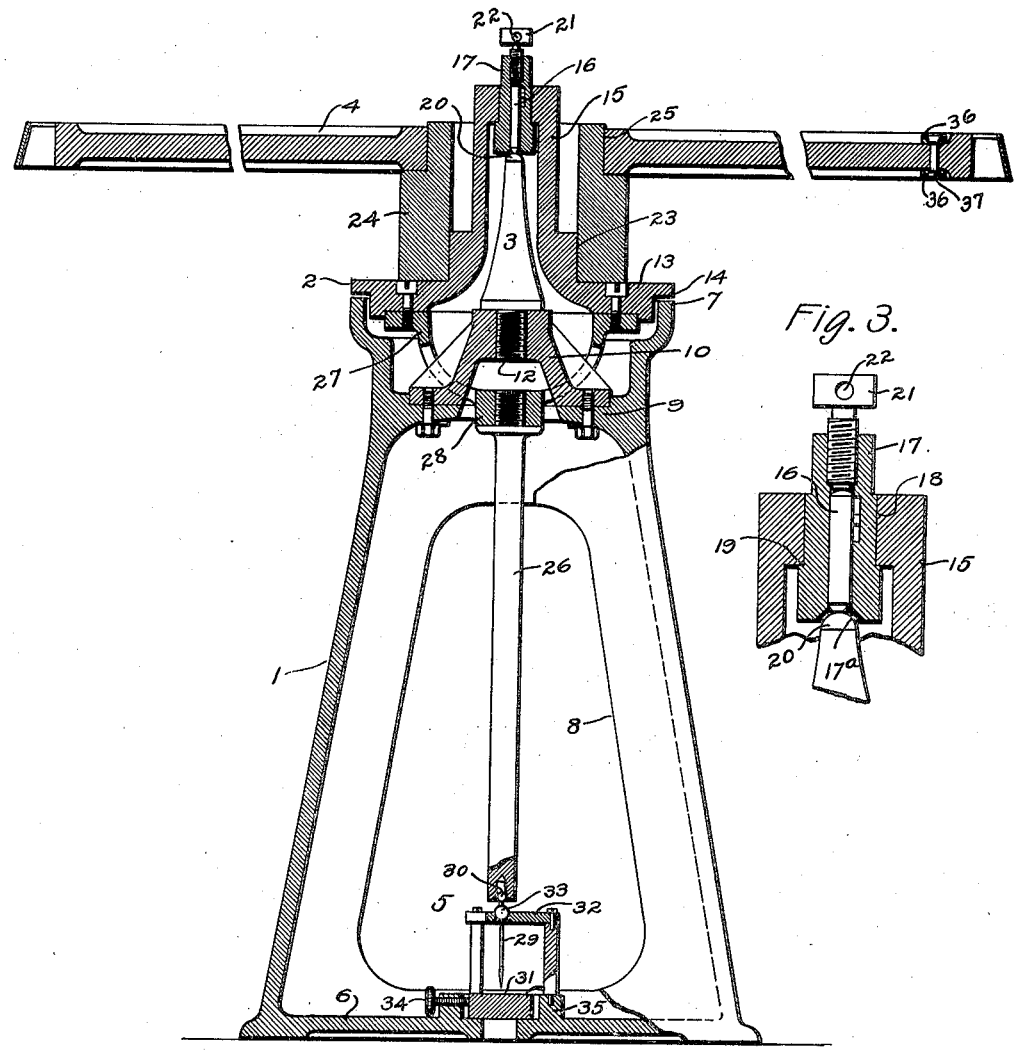
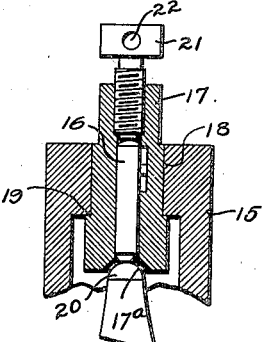
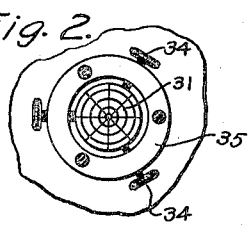
Witnesses:
Harold F. Locke
Helen Alford
Inventor:
John Riddell.
by Albert G. Davis
Att'y.

UNITED STATES PATENT OFFICE.

JOHN RIDDELL, OF SCHENECTADY, NEW YORK, ASSIGNOR TO GENERAL ELECTRIC COMPANY, A CORPORATION OF NEW YORK.

BALANCING-MACHINE.

1,091,708.

Specification of Letters Patent. Patented Mar. 31, 1914.

Application filed March 1, 1905. Serial No. 247,909.

*To all whom it may concern:*

Be it known that I, JOHN RIDDELL, a citizen of the United States, residing at Schenectady, county of Schenectady, State of New York, have invented certain new and useful Improvements in Balancing-Machines, of which the following is a specification.

My invention relates to machines for balancing rotative bodies of a character that require to be balanced with utmost precision, as for example bucket wheels for elastic fluid turbines. Such bodies are intended to have high angular velocities and unless they are perfectly balanced rotation is attended with more or less vibration, which at operative speeds may be enormous and prohibitive.

The object of my invention is to provide a machine of the static balancing type which will be thoroughly reliable for balancing bucket wheels or similar bodies, and with which extremely rapid balancing can be done.

In static balancing machines, as commonly used, the body to be balanced is mounted on a horizontal shaft which bears upon parallel ways or rollers. Mounted in this position the body is free to oscillate. The condition of balance is determined by moving the body from its position of rest to cause it to oscillate, and then noting the position into which it settles. This is repeated two or more times, and if the body is out of balance it returns approximately to the same position each time it is disturbed, thus indicating the location of the heavy part, which gravitates to the lowest point. Knowing the location of the heavy portion, the object is to balance this by properly varying the distribution of the mass, which is a matter of trial. Weight is added or subtracted at the proper point or points, and the condition of balance again determined by oscillating the wheel and noting the position of rest, as before. This process may have to be, and usually is, carried out a number of times before perfect balance is obtained. While very good results may be obtained with this method of balancing, the main objection thereto is the length of time required to perform the complete operation, due to the fact that the sum total of the oscillations constitutes a considerable time element, which renders the operation expensive.

With my invention this objection is successfully overcome, and very accurate and almost instantaneous indications as to the condition of balance can be obtained. This is accomplished by supporting the wheel or body to be balanced in a horizontal plane with its axis vertical, and permitting the wheel to be tilted or depressed in any direction, according to the position of the heavy point. Supported in this manner it is necessary for eliminating oscillations that provision be made for limiting the tilting movement and quickly arresting motion of the wheel, thereby reducing the time required to make an indication.

In the practical embodiment of the invention, I employ a horizontal table which is mounted upon an upright pivot and is capable of universal movement thereon. The wheel is mounted centrally on the table, preferably on a removable holder which is especially adapted for the particular size of wheel to be balanced. A convenient form of holder is a sleeve which fits a central shoulder or boss provided on the table, its upper end being shouldered to fit snugly in the shaft opening of the bucket-wheel. A number of holders are provided for the machine, which are adapted to be employed interchangeably for wheels of different sizes.

The pivot is arranged on a supporting column or frame, and the table is mounted in such a position that the upper end of the column, which is preferably cylindrical or annular, is juxtaposed to the table and serves as an abutment or rest for limiting the tilting movement of the table. In order to prevent excessive movement of the table and to maintain it central during the mounting or dismounting of the wheel, or during the process of adding or subtracting mass, the table is adapted to be held relatively stationary. For this purpose I provide means whereby the point of support for the table can be readily transferred from the normal position for balancing to an inoperative position and vice versa. This means comprises a bearing pin of hard metal on which the table is adapted to be raised or lowered with respect to the pivot for transferring the point of support. The lower end of the bearing pin is turned off flat and rests upon the spherical end of the pivot which is also of hard metal. These two surfaces are in engagement when the table is in normal balancing position and they form a bearing of relatively small area of contact which permits universal movement with a minimum of friction. Adjacent the lower end of the bearing pin is a seat on the table which is separated from the pivot by a slight clearance when the table is in normal position. When it is desired to hold the table relatively stationary it is lowered on the bearing until the seat engages with the pivot, thereby transferring the point of support from the bearing pin to the seat. The movement of the table is accomplished by means of a screw arranged in the table and impinging upon the upper end of the pin so that by rotating the screw the operator can either raise or lower the table.

The extent of the tilting of the table, due to the unbalanced mass of the wheel, is determined by an indicating mechanism located in the supporting column and exposed to view. This mechanism comprises a pendant arm rigidly secured to the table and extending centrally of the column to a point adjacent the base thereof where it is attached to a needle or pointer which is actuated thereby. The needle is mounted to have universal movement, and the point or lower end thereof is adapted to move over a circular dial arranged at the base of the supporting column. The fulcrum of the pointer or needle is adjacent the upper end, so that the range of movement of the point of the needle is relatively much larger than that of the upper end. In other words, the needle multiplies the angular movement of the table, so that very delicate indications can be obtained. With this arrangement, it will be noted that the table settles at the point where the heavy portion of the wheel is located. This throws the arm to the side of the center line opposite to that on which the heavy point of the wheel is located. The arm in turn swings the needle so that its lower end points to the same side of the center line on which the heavy portion of the wheel is located, thus indicating directly the position of the heavy point.

In using the machine, the table is first lowered so that the seat thereof will rest on the pivot and the wheel is placed in position by means of the shop crane, or otherwise. The table with the wheel thereon is then raised from the seat and the point of support transferred to the bearing pin to support the table freely on the pivot. When the wheel is out of balance the table settles at a point in line with the heavy portion and immediately comes to rest on the abutment without oscillation. This movement actuates the needle, and the position of the same with respect to the dial indicates the location of the heavy portion of the wheel. After ascertaining the location of the heavy portion, the next step is to determine the proper mass to be added at the light point of the wheel, and this is done by trial. Each time the mass is applied to the wheel the table is preferably first lowered to rest on the pivot by means of its seat for preventing excessive vibration of the same and the pointer. After the mass is applied the table is raised and the position of the needle on the dial is ascertained. This procedure is repeated with masses of different weight until a condition is reached where the needle coincides exactly with the center of the scale, which indicates perfect balance.

For an understanding of the details of construction, reference is to be had to the following description, taken in connection with the accompanying drawing, while the novel features will be defined in the claims appended hereto.

In the accompanying drawing, which illustrates one embodiment of the invention, Figure 1 is a central vertical section of a balancing machine and a turbine wheel in position thereon; Fig. 2 is a detail view of the dial of the indicating mechanism; and Fig. 3 is an enlarged vertical section of the pivotal bearing of the balancing table and the means for raising and lowering it.

Referring to the drawing, 1 represents the stationary table column, or stand of the machine; 2 the balancing table; 3 the stationary pivot or post upon which the table is mounted; 4 the bucket wheel arranged on the table; and 5 the indicating mechanism. The column is a hollow frusto-conical frame cast with a base-plate or web 6, and having a cylindrical or annular upper end which forms an abutment or rest 7 for the table. The shaft portion of the column is provided with openings 8 for exposing to view the indicating mechanism 5, which is arranged within the column. Supported in the upper end of the column on an interior flange 9 is an arch-shaped bridge-piece 10, which is bolted or otherwise secured at its base to the flange. Mounted centrally on the bridge-piece is the upright post or pivot 3. The pivot is provided with a threaded shank 12 which screws into a tapped central bore in the bridge-piece.

The table 2 comprises an annular plate 13 which is provided with a circumferential shoulder 14 that overhangs the annular abutment 7 with which it is adapted to engage. The table is formed with a central tubular extension 15 in which the pivot 3 is disposed, ample clearance being provided between the inner wall of the extension and the pivot to enable the table to tilt. The means for supporting the table on the pivot comprises a bearing pin 16 arranged in a bushing 17. The bushing is fitted in an opening 18 in the upper end of the extension and it supports the table by means of an annular shoulder 19, Fig. 3. The bearing pin is turned off flat at its lower end and is adapted to bear upon the spherical surface 20 at the upper end of the pivot 3. This constitutes the point of support when the table is in balancing position. The lower end of the bushing is provided with a conical seat 17ª which is adapted to engage with the pivot when the table is to be held relatively stationary. In order to transfer the point of support from the lower end of the bearing pin to the seat or bearing 17ª, or vice versa, the bushing with the table is movable longitudinally of the pin. For this purpose a screw 21 is arranged in the bushing with its inner end impinging upon the bearing pin so that by turning the screw inwardly the bushing and table are raised and the seat 17ª moved away from the pivot. By turning the screw outwardly the bushing and table are lowered and the seat moved into engagement with the pivot, thereby removing the point of support from the bearing pin. As the seat is conical the table is maintained in central position on the pivot so that when the point of support is transferred again to the pin the latter will bear centrally on the pivot. To actuate the screw the head thereof is provided with an opening 22 for receiving an operating bar or lever.

The base of the tubular extension of the table forms a cylindrical shoulder 23, on which a removable holder 24 for the wheel is assembled. This holder is preferably a sleeve having an inner diameter corresponding to that of the shoulder to snugly fit the same. The upper end of the sleeve is reduced to form a surface or shoulder upon which the bucket-wheel rests, and the reduced spindle portion fits snugly in the shaft opening 25 of the wheel. In order to adapt the machine for balancing wheels of different sizes interchangeable holders are employed. These differ from one another only in respect to the diameter of the reduced portion at their upper ends so as to fit different sized shaft openings. It is to be noted that the shoulder of the holder is located at such a point that when the wheel is placed thereon the center plane of the wheel coincides with the pivotal point of the table, this arrangement giving the best balancing effect in practice.

The indicating mechanism comprises a pendant arm 26 which is secured to the under side of the balancing table and extends centrally therefrom. The arm is attached to the table by an intermediate saddle-piece 27, which straddles the bridge-piece and is bolted or otherwise secured to the table. The saddle-piece is provided with a central boss 28 having a tapped opening into which the upper end of the arm screws. The lower end of the arm is connected with a needle or pointer 29 through a slip or ball-and-socket joint 30. The pointer is mounted over a circular dial 31 in a bearing plate 32, the bearing comprising a spherical enlargement or ball 33, so as to permit of universal movement of the pointer. The bearing or fulcrum of the pointer is adjacent the upper end, and the length of the lower arm is several times that of the upper arm, so that the movement imparted to the pointer by the pendant arm of the table is considerably multiplied; thus enabling slight movements of the balancing table to be indicated on the scale.

It is necessary to calibrate the indicating mechanism preliminary to balancing a wheel, and in order to do this, the dial is adjustable. Set screws 34 are employed for this purpose which are arranged in an upright circular flange 35 formed on the baseplate, and they engage the periphery of the dial at three or more points.

The balancing operation is as follows: The table being in its lowered position, that is to say, the seat resting on the pivot, the wheel to be balanced is placed on the holder. It is necessary first to test the relation of the pointer to the dial, or in other words, to calibrate the machine with the wheel in position. This is done by noting the various positions the pointer will take when the wheel is turned about its axis to successive positions,—say about 45 degrees apart. During this operation the pointer will describe a circle, the center of which should coincide with that of the dial. If this is not the case, the dial is then set to approximate as closely as possible this position. Having calibrated the mechanism, the balancing begins. This consists in applying mass to the wheel at the light point, the latter being at that side of the wheel which is diametrically opposite to that toward which the needle points. The exact weight of the mass is determined by the judgment of the operator, and is more or less a question of skill. The mass is applied while the balancing table is at rest, i. e., in its lowered position, and then the table is raised so as to rest freely on the pivot. The position of the pointer with respect to the center of the dial is carefully noted to ascertain if the mass is under or over weight. In either case the mass is altered and the test repeated, and this process is carried on repeatedly until a condition of balance is reached where the point of the needle coincides with the center of the dial, and this in every position which the table may occupy around its axis. The mass added to the wheel is preferably in the form of plates 36, which are secured in place by a rivet 37. During trials the plates and rivet are loosely placed in position and the balance determined. If the plates are too light heavier ones are employed. If too heavy they are removed and filed away until the proper weight is finally obtained, when they are then riveted permanently to the wheel, on opposite surfaces as shown. It will be noted that with the method of balancing above described, the indications are obtained very quickly as oscillations of the wheel are entirely eliminated, hence the total time required for balancing the wheel as compared with the method hitherto in practice is greatly reduced.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is:

1. In a balancing machine, the combination of a supporting frame, a balancing table, means on said table for carrying the body to be balanced, said table being mounted on the frame so as to be universally movable about a vertical axis, an indicating mechanism mounted on the frame and means for transmitting movements of said table to said indicating mechanism.

2. In a balancing machine, the combination of a supporting frame, a balancing table for the work to be balanced, a vertical pivot mounted on the frame on which the table is universally movable, an abutment for limiting the movement of the table, and an indicating mechanism moved by the table.

3. In a balancing machine, the combination of a supporting column, a balancing table centrally pivoted thereon to have universal movement, means for limiting the movement of the table, and an indicating mechanism mounted on the column at one side of the normal plane of the table and means for transmitting movements of said table to said indicating mechanism whereby said indicating mechanism is responsive to the movements of said table.

4. In a balancing machine, the combination of a supporting column, a balancing table for holding the body to be balanced, a universal bearing between them, an abutment formed on the column for limiting the movement of the table, and an indicating mechanism arranged in the column and moved by the table.

5. In a balancing machine, the combination of a supporting column, a central pivot mounted on the same, a universally movable table supported on the pivot, an abutment for the table which is disposed adjacent to the periphery of the same, and an indicating mechanism connected with the table for indicating its movements.

6. In a balancing machine, the combination of a supporting column, a vertical pivot on the column, a universally movable table mounted on the pivot which table is disposed horizontally, a holder for the body to be balanced which is centrally arranged on the table, and an indicating mechanism for determining the condition of balance of the body which is actuated by the table as it and the body move due to the unbalanced condition of said body.

7. In a balancing machine, the combination of a supporting column, a vertical pivot on the column, a table centrally pivoted thereon, a holder on the table which supports the body to be balanced in such a position that the central plane of the body and the pivotal center coincide, and an indicating mechanism for determining the condition of balance of the body which is actuated by the table as it and the body tilt about the pivot due to the unbalanced condition of said body.

8. In a balancing machine, the combination of a support, a table universally movable thereon, a holder for the body to be balanced which holder is removably mounted on the table, and universally movable indicating mechanism associated with the table for indicating the condition of balance of the body.

9. In a balancing machine, the combination of a support, a table pivotally mounted thereon, a central shoulder on the table, a holder or sleeve fitted on the shoulder for supporting the body to be balanced, and an indicating mechanism moved by the table.

10. In a balancing machine, the combination of a support, a balancing table provided with a tubular extension, a pivot on the support which is disposed within the tubular extension and forms a universal bearing for the table, and an indicating mechanism moved by the table.

11. In a balancing machine, the combination of a supporting column, a balancing table having an extension formed thereon, a bearing-pin arranged in the extension, a vertical pivot supported by the column upon which the bearing pin rests to permit universal movement of the table, and an indicating mechanism moved by the table.

12. In a balancing machine, the combination of a supporting column, a balancing table, an extension provided on the table, a bearing arranged in the extension, a pivot supported by the column and engaging the said bearing, an abutment for limiting the movement of the table, and an indicating mechanism moved by the table.

13. In a balancing machine, the combination of a supporting column provided with an abutment at its upper end, a balancing table, a pivot supported by the column, a bearing pin carried by the table which supports the latter on the pivot in coöperative relation to the abutment, a bearing or seat on the table, means for moving the table to transfer the point of support from the bearing pin to the seat, or vice versa, and an indicating mechanism connected with the table, which comprises a pointer, a member on the table for actuating the pointer, and a connection between the member and pointer which permits the table to be moved with respect to the pointer.

14. In a balancing machine, the combination of a supporting column provided with an abutment at its upper end, a vertical pivot supported on the column, a balancing table resting on the pivot and disposed in coöperative relation to the abutment, means for holding the table in a relatively stationary and central position on the pivot, and an indicating mechanism, comprising a pointer, an arm on the table, and a slip joint between the pointer and the arm.

15. In a balancing machine, the combination of a supporting column provided with an annular abutment, a vertical pivot on the column, a balancing table supported by the pivot and adjacent to the abutment, a bearing pin between the table and the pivot, means for holding the table in a relatively stationary and central position on the pivot, means for raising and lowering the table on the bearing pin for moving it into or out of engagement with the said means, and an indicating mechanism which is moved by the table.

16. In a balancing machine, the combination of a supporting column, a vertical pivot carried thereby, a balancing table having an upright extension, an abutment for limiting the tilting of the table, a bearing pin on the extension which supports the table on the pivot, a bushing for the pin carried by the extension, a conical seat on the bushing which is adapted to engage with the pivot to hold the table relatively stationary and central on the pivot, a screw operating through the pin for moving the seat into and out of engagement with the pivot, and an indicating mechanism movable with the table.

17. In a balancing machine, the combination of a supporting column, a universally movable balancing table thereon, means on said table for holding the article to be balanced, a bearing on the column for said table, and an indicating mechanism arranged within the column and actuated by the table.

18. In a balancing machine, the combination of a supporting column, a pivotal bearing on the column, a universally movable balancing table mounted thereon, an arm attached to the table, a pointer connected with the arm, and a dial arranged in coöperative relation to the pointer.

19. In a balancing machine, the combination of a supporting column, a universally movable balancing table thereon, a central pendant arm secured to the table, a pointer supported on the base of the column which multiplies the angular movement of the table, a universal bearing for the pointer, a universal connection between the pointer and arm, a dial arranged in coöperative relation to the pointer, and means for adjusting the dial.

20. In a balancing machine, the combination of a balancing table, a universal bearing for the table, comprising a spherical surface and a flat surface engaging with each other, and an indicating mechanism actuated by the table.

21. In a balancing machine, the combination of a balancing table, a universal bearing for the table comprising a spherical surface and a flat surface, means for moving the surfaces into and out of engagement with each other, and mechanism for indicating the condition of balance of a body supported on the table.

22. In a balancing machine, the combination of a balancing table, a universal bearing for the table comprising members having a spherical surface and a flat surface, a seat adjacent the bearing with which the spherical surface may engage, and means coöperating with the bearing members which transfers the support of the table from the flat surface to the seat and vice versa.

23. In a balancing machine, the combination of a supporting member, a balancing table, a pivot member carried by said balancing table, a pivot member carried by said supporting member, said pivot members coöperating to form a universally movable bearing for the balancing table, indicating mechanism mounted on said supporting member below said table, and means for transmitting the movements of said table to said indicating mechanism.

24. In a static balancing machine, the combination of a supporting column, a single pivot on the column, a table for receiving the body to be balanced and which is centrally mounted for universal movement on said pivot, and mechanism which is actuated as the table and body tilt about the pivot for indicating the extent to which the body is out of balance.

25. In a balancing machine, the combination of a vertically disposed supporting column, a pivot centrally mounted on the upper portion of said column and provided with a spherical bearing surface, a balancing table, a pin centrally mounted for sliding movement in the table and provided with a flat bearing surface at its lower end which engages with said spherical surface, a screw mounted in the table and engaging the upper end of the pin for raising and lowering the table with respect to the pivot, an arm secured to the lower portion of the table and projecting downward within the column, a universal bearing arranged adjacent the base of the column, a pointer mounted in the bearing at a point intermediate its ends, there being a socket in the lower end of the arm with which the upper end of the pointer is in sliding and pivotal engagement, and a dial arranged adjacent the lower end of the pointer.

26. In a balancing device, a stationary table or support, a movable table supported thereon so as to be capable of tilting in all directions relatively thereto, said movable table having an upper surface for supporting the article to be balanced, a spindle extending downward from the movable table, and means for multiplying the movement of said spindle.

27. In a balancing device, a stationary table, a movable table supported thereon so as to be capable of tilting in all directions, said movable table having an upper surface for supporting the article to be balanced, an indicating rod or needle mounted for universal movement, and means for transmitting movement from the movable table to the indicating needle.

28. In a balancing machine, the combination of a stationary frame or support, a movable table, a universal bearing supporting the table on the frame or support and permitting a universal movement of said table, means on the upper surface of said table for supporting the article to be balanced, means for indicating the movement of the table and means for transmitting the movements of said table to said indicating means.

29. In a balancing machine, the combination of a stationary frame, a movable table for supporting the article to be balanced, a universal bearing supporting the table on the frame and permitting a universal tilting movement of said table, and means for temporarily preventing tilting of the table in any direction.

In witness whereof I have hereunto set my hand this 28th day of February, 1905.

JOHN RIDDELL.

Witnesses:
BENJAMIN B. HULL,
HELEN ORFORD.